(No Model.)
J. HUNTER & U. HASKIN.
OILING BOX FOR ROLLS AND PINIONS.
No. 257,947. Patented May 16, 1882.
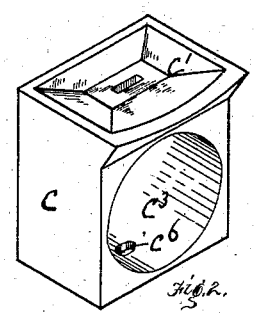
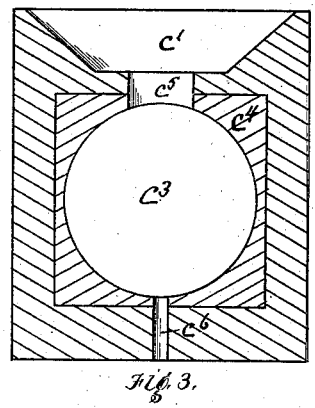
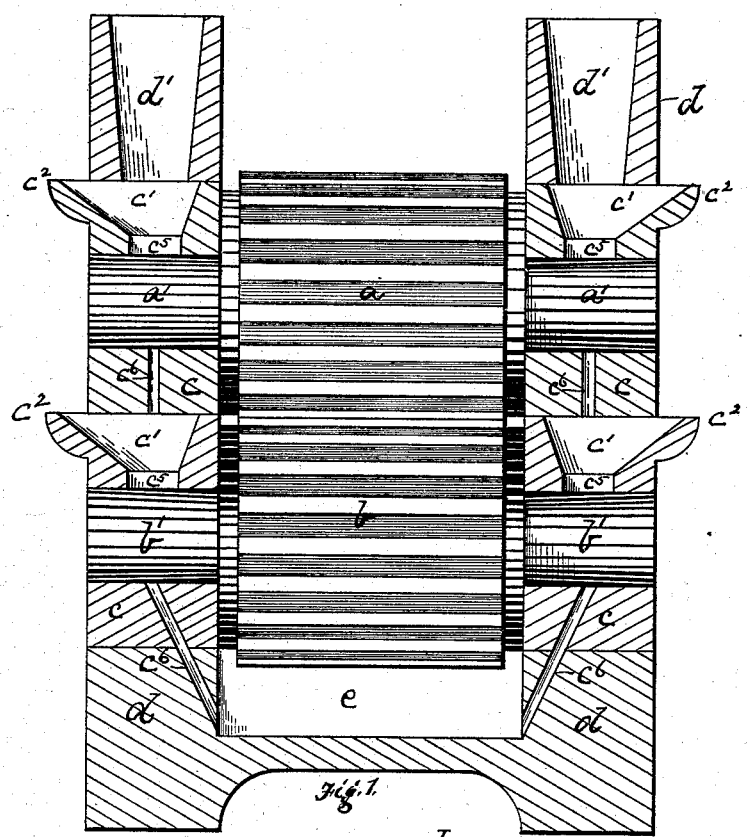
Witnesses
Jno. K. Smith
L. C. Sickler
Inventors
Uri Haskin
James Hunter
by their attys Bakewell & Kerr

UNITED STATES PATENT OFFICE.

JAMES HUNTER AND URI HASKIN, OF PITTSBURG, PENNSYLVANIA, ASSIGNORS OF ONE-THIRD TO SAMUEL T. OWENS, OF SAME PLACE.

OILING-BOX FOR ROLLS AND PINIONS.

SPECIFICATION forming part of Letters Patent No. 257,947, dated May 16, 1882.

Application filed January 27, 1882. (No model.)

*To all whom it may concern:*

Be it known that we, JAMES HUNTER and URI HASKIN, both of Pittsburg, in the county of Allegheny and State of Pennsylvania, have invented a new and useful Improvement in Oiling-Boxes for Rolls and Pinions; and we do hereby declare the following to be a full, clear, and exact description thereof.

Our invention relates to the construction of bearings for the necks of pinions and rolls; and it consists in forming the bearing with a recess or concavity on top, which communicates to the upper side of the bearing by a hole or channel, so that the oil for lubricating shall pass through onto the journal of the roll or pinion, and thence by a hole or channel leading from the bottom of the bearing down into the bearing of the next roll or pinion below, and so on through each box until at the lower one it is led by a suitable channel into a trough under the rolls or pinions, where it is used to oil the teeth of the pinion and the face of the roll whenever it is desirable to do so.

To enable others skilled in the art to make and use our invention, we will now describe it by reference to the accompanying drawings, in which—

Figure 1 is a vertical sectional view of a pair of pinions and housings which are of our improved construction. Fig. 2 is a perspective view of one of the bearings with the oil-slot extending at right angles to the neck of the roll. Fig. 3 is a vertical cross-sectional view of the same.

Like letters of reference indicate like parts in each.

The pinions $a$ $b$ are mounted in a suitable housing, $d$, and their necks $a'$ $b'$ rest in bearings $c$. Under the lower pinion, $b$, is a trough, $e$. The pinion $b$ is set low enough to cause its teeth to pass into and through the trough in turning. The bearings $c$ are of a peculiar form. They have a shallow recess or concavity, $c'$, in their upper surface and a projecting lip, $c^2$, which, when they are in place, projects beyond the vertical line of the housings, the concavity $c^2$ also extending out beyond the housing, so that it may be filled with oil from the outside and catch the drip from the bearing above. Extending laterally through the bearing is a hole, $c^3$, for the neck of the pinion, which hole is surrounded by a packing of Babbitt metal or other suitable material, $c^4$. The concavity $c'$ communicates with the opening $c^3$ by means of a slot or hole, $c^5$. Extending down from the lower side of hole $c^3$ is a channel, $c^6$. When the bearing is in place in the housing, the channel $c^6$ leads down to and opens into the concavity $c'$ of the bearing next below. The same description answers to the lower bearings, except that the channel $c^6$ leads into the trough $e$, so that the oil which escapes from the lower bearing, $c$, shall pass into and be caught by the trough $e$. The trough $e$ is filled with oil to the top, or at least to a sufficient height to enable it to oil the teeth of the lower pinion, $b$, the latter, as before described, turning in the trough and necessarily coming in contact with the oil therein. The oil is preferably supplied through the open top $d'$ of the housing-standards. The projecting lip $c^2$ of the lower bearing catches and returns to the necks of the rolls any of the oil which may work out to the end of the neck and get on the outside of the housings. A similar cup, $c^2$, connecting to the lower passages, $c^6$, may be placed under the necks of the lower roll or pinion.

By the arrangement just described the oil in its descent to the trough $e$ passes over the neck of each roll, and this is the case whether there are two or more rolls or pinions. Practical experience has demonstrated that in the use of this construction there is but little waste of oil, and a saving in time and trouble in oiling the journals and the teeth of pinions is obtained, and that the necks of the rolls are more perfectly lubricated.

The device is cheap and efficient.

Instead of one slot, $c^5$, there may be any desired number of holes leading through the bearing. The slot $c^5$ in Fig. 1 distributes the oil on a greater length of the neck than that shown in Figs. 2 and 3.

What we claim as our invention, and desire to secure by Letters Patent, is—

1. A bearing for the journals of rolls or pinions, having a cup or concavity in the top communicating to the neck of the roll by a suitable hole or passage, said bearing having also a hole or passage through the lower part to lead the oil down upon the collar of the subjacent roll, substantially as and for the purposes described.

2. A bearing for the journals of rolls and pinions, having an oil cup or concavity in the top and a lip extending laterally at its upper edge, which, when the bearing is in place, projects beyond the face of the housing for filling said oil-cup and catching the drip from the journal above, substantially as and for the purposes described.

3. Hollow housing-standards, in combination with an oiling hole or holes leading through the bearings to the necks of the rolls, substantially as and for the purposes described.

4. In combination with journal-bearings for rolls and pinions, having oil-holes extending into and down from the bearing-surface, a trough placed under the lower roll or pinion and a channel leading from the bearing-surfaces of the journal-boxes to said trough, substantially as and for the purposes described.

In testimony whereof we have hereunto set our hands this 13th day of January, A.D. 1882.

JAMES HUNTER.
URI HASKIN.

Witnesses:
L. C. FITTER,
JAMES H. PORTE.